United States Patent
Ehlert et al.

(10) Patent No.: US 11,181,079 B2
(45) Date of Patent: Nov. 23, 2021

(54) FUEL VAPOR PROCESSING APPARATUS

(71) Applicant: MAHLE International GmbH, Stuttgart (DE)

(72) Inventors: Thomas Ehlert, Böblingen (DE); Achim Gommel, Weil der Stadt (DE); John Jackson, Oxford, MI (US); Simon Streng, Stuttgart (DE); Melanie Volz, Königsbach (DE)

(73) Assignee: MAHLE International GmbH, Stuttgart (DE)

( * ) Notice: Subject to any disclaimer, the term of this patent is extended or adjusted under 35 U.S.C. 154(b) by 161 days.

(21) Appl. No.: 16/707,062

(22) Filed: Dec. 9, 2019

(65) Prior Publication Data
US 2021/0172400 A1   Jun. 10, 2021

(51) Int. Cl.
*F02M 25/08* (2006.01)
*B60K 15/035* (2006.01)

(52) U.S. Cl.
CPC ..... *F02M 25/089* (2013.01); *B60K 15/03504* (2013.01); *B60K 2015/03514* (2013.01); *F02M 25/0836* (2013.01); *F02M 25/0854* (2013.01); *F02M 25/0872* (2013.01)

(58) Field of Classification Search
CPC ............. F02M 25/089; F02M 25/0836; F02M 25/0872; F02M 25/0854; B60K 15/03504; B60K 2015/03514
See application file for complete search history.

(56) References Cited

U.S. PATENT DOCUMENTS

| | | | |
|---|---|---|---|
| 5,957,113 A | 9/1999 | Masaki et al. | |
| 6,772,740 B2 | 8/2004 | Kojima et al. | |
| 7,261,092 B1 | 8/2007 | Oku et al. | |
| 9,732,649 B2 * | 8/2017 | Hiltzik | ............. F02M 35/10222 |

\* cited by examiner

*Primary Examiner* — Xiao En Mo
(74) *Attorney, Agent, or Firm* — Dickinson Wright PLLC

(57) ABSTRACT

This disclosure relates to a separation apparatus for use in a fuel emission control system. The separation apparatus includes a tube being disposed within a conduit of the fuel emission control system and a membrane being disposed within the tube. The tube includes an introduction port for introducing a fuel vapor generated in a fuel tank. The disposition of the membrane increases turbulence of the fuel vapor in the tube and separates the fuel vapor into a fuel-rich mixture and a fuel-lean mixture. The tube further includes a discharge port for discharging the fuel-rich mixture.

11 Claims, 4 Drawing Sheets

FUEL VAPOR PROCESSING APPARATUS

TECHNICAL FIELD

This disclosure is directed generally to fuel vapor emission processing and particularly to removing fuel particles from vapor before being discharged into the atmosphere.

BACKGROUND

Due to the volatile nature of fuel, for example, gasoline for a combustion engine, fuel vapor builds up in the fuel tank of a vehicle during rest times of the vehicle. As a result, the internal pressure of the fuel tank is increased, which in turn leads to fuel vapor leaks from the fuel passages. In order to reduce the internal pressure of the fuel tank and reduce the load of fuel present in the discharged vapor before discharge into the atmosphere, a membrane separation means is introduced which can separate the fuel vapor into a fuel-rich vapor and a fuel-lean vapor. The fuel-lean vapor may be discharged into the atmosphere. The fuel-rich vapor may be dissolved back into the fuel tank.

The membrane separation means has previously been implemented as an independent spatial unit, which is partitioned by a membrane into two chambers. One chamber serves to hold the fuel vapor components permeating the membrane. The other chamber serves to hold the remained fuel vapor components failing to permeate the membrane.

SUMMARY

This disclosure is directed to systems and devices related to fuel emission processing, and more specifically, for extracting the fuel components from the fuel vapor before discharging the fuel vapor into atmosphere.

In one embodiment, a separation apparatus for use in a fuel emission control system is disclosed. The separation apparatus includes a tube being disposed within a conduit of the fuel emission control system and a membrane being disposed within the tube. The tube includes an introduction port for introducing fuel vapor generated in a fuel tank. The disposition of the membrane increases turbulence of the fuel vapor in the tube and separates the fuel vapor into a fuel-rich mixture and a fuel-lean mixture. The tube further includes a discharge port for discharging the fuel-rich mixture.

In another embodiment, a fuel emission control system is disclosed. The fuel emission control system includes a canister adsorbing fuel vapor generated in a fuel tank, a conduit providing fluid communication from the fuel tank to the canister, and a separation apparatus being disposed within the conduit. The separation apparatus includes an introduction port for introducing the fuel vapor from the fuel tank and a membrane being disposed within the separation apparatus. The disposition of the membrane increases turbulence of the fuel vapor in the separation apparatus and separates the fuel vapor into a fuel-rich mixture and a fuel-lean mixture. The separation apparatus further includes a discharge port for discharging the fuel-rich mixture. The discharged fuel-rich mixture flows to the canister for adsorption via the conduit.

In a further embodiment, a fuel emission control system is disclosed. The fuel emission control system includes a canister and a separation apparatus. The canister adsorbs a fuel vapor generated in a fuel tank and discharges a canister-discharged fuel vapor that is not adsorbed by the canister. The separation apparatus includes an introduction port for introducing the canister-discharged fuel vapor and a membrane being disposed within the separation apparatus. The disposition of the membrane increases turbulence of the canister-discharged fuel vapor in the separation apparatus and separates the canister-discharged fuel vapor into a fuel-rich mixture and a fuel-lean mixture. The separation apparatus further includes a discharge port for discharging the fuel-rich mixture.

The above and other aspects and their implementations are described in greater detail in the drawings, the descriptions, and the claims below.

DETAILED DESCRIPTION

Figure 1:
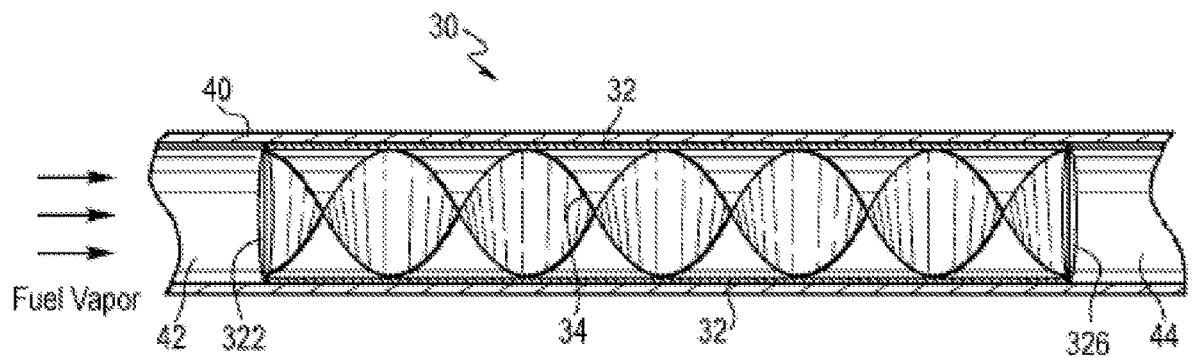
FIG. 1 shows a schematic diagram of fuel separation apparatus in accordance with an embodiment.

The technology and examples of implementations and/or embodiments in this disclosure can be used to extract the fuel components from the fuel vapor before discharging the fuel vapor into atmosphere. The term "exemplary" is used to mean "an example of" and unless otherwise stated, does not imply an ideal or preferred example, implementation, or embodiment. The implementations may, however, be embodied in a variety of different forms and, therefore, the covered or claimed subject matter is intended to be construed as not being limited to any of the embodiments to be set forth below.

Hereinafter, exemplary embodiments of this disclosure will be described with reference to the drawings. Like elements are denoted by like reference numerals in the drawings, and repletion of the same description will be avoided.

The embodiments separation apparatus and the fuel emission control system are described in the exemplary context of automobile vehicles, however it should be appreciated that these embodiments are applicable in other suitable contexts.

FIG. 1 is a schematic diagram showing a separation apparatus 30 for use in a fuel emission control system according to an embodiment. The conduit 40 is a part of the fuel emission control system. The fuel vapor generated in a fuel tank of an automobile vehicle may flow to the fuel emission control system via conduit 40 as illustrated in FIG. 1. The separation apparatus 30 includes a tube 32 and a membrane 34 disposed within the tube 32. Generally, the fuel vapor is a mixture of fuel components such as hydrocarbons and air components such as nitrogen and oxygen.

The tube 32 is disposed within the conduit 40 and partition the conduit 40 into two parts, conduit 42 and conduit 44. In order to readily fitting into the conduit 40, the tube 32 can be shaped to align with the conduit 40, for example, cylinder or square. In some implementations, the space between the outer surface of the tube 32 and the inner surface of the conduit 40 may be filled with sealing material. In other implementations, the outer surface of the tube 32 may abut against the inner surface of the conduit 40 such that the tube 32 seamlessly fit into the conduit 40. Note that this disposition will not change the dimension of the conduit 40 of the fuel emission control system. For example, a diameter of the conduit 40 is constant upstream from, along, and downstream from the tube 32 before and after the disposition of the tube 32 within the conduit 40.

The tube 32 includes an introduction port 322 and a discharging port 326. The introduction port 322 introduces the fuel vapor into the tube 32. The discharging port 326 discharges a part of the fuel vapor that may pass through the tube.

The membrane 34 is disposed within the tube 32. In order to pass through the tube 32, the fuel vapor needs to permeate the membrane 30. The membrane 30 serves to separate fuel components from the fuel vapor.

Figure 2A:
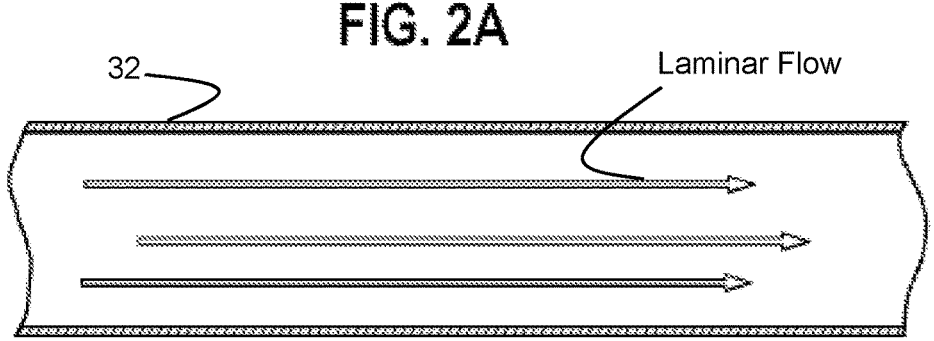
FIG. 2A is a schematic diagram showing fluid flow patterns under laminar flow mode.
Figure 2B:
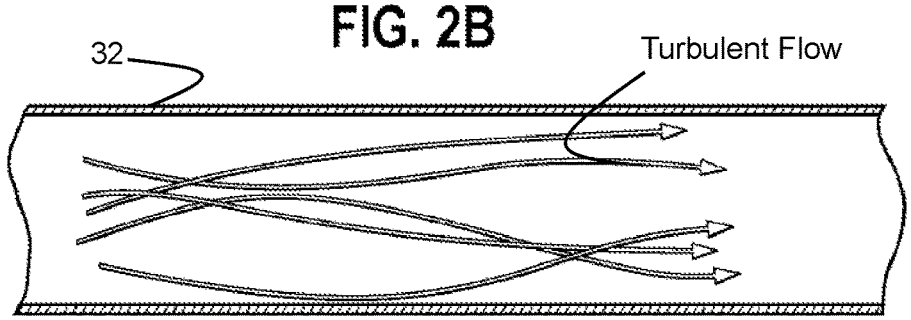
FIG. 2B is a schematic diagram showing fluid flow patterns under turbulent flow mode.
Figure 3:
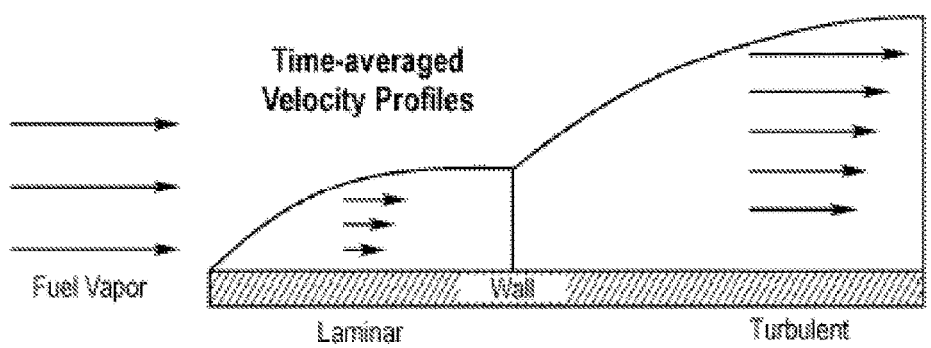
FIG. 3 is a schematic diagram showing fluid velocity profiles in laminar flow mode and turbulent flow mode.

Typically, a flow of fluid may be classified two types, laminar flow and turbulent flow. Laminar flow is characterized by fluid particles following smooth path in layers, with each layer moving smoothly past the adjacent layers with little or no mixing as illustrated in FIG. 2A. In contrast to laminar flow, the fluid undergoes fluctuations or mixing in turbulent flow as illustrated in FIG. 2B. FIG. 3 is a schematic diagram showing fluid velocity profiles in laminar flow mode and turbulent flow mode. As illustrated, in laminar flow mode, the fluid will flow near the flat wall. The direct contact between the fluid and the wall render a no-slip condition which assumes that the fluid will have zero velocity relative to the wall. As a result, the fluid velocity near the wall is slow as illustrated in FIG. 3.

With respect to the fuel vapor herein, it is expected that the fuel vapor has a low mass flow, and thus will flow in laminar mode. Under the laminar flow mode, where the fuel vapor permeates through the membrane in the layer next to the membrane wall, no replenishment from the core fuel vapor flow can take place because there is only parallel flow near the membrane wall. Therefore, it is desirable for the fuel vapor to transit from laminar flow mode towards turbulent flow mode so as to break up the laminar parallel layers near the wall, which ensures the replenishment of the fuel vapor.

To accomplish this object, the membrane 34 may be disposed within the tube 32 in a way that increases turbulence of the fuel vapor within the tube 32. Herein, the "turbulence" may be increased to either a full turbulent flow or a intermediate flow between the laminar flow and the turbulent flow. In the full turbulent flow, all of the fuel vapor flows in turbulent mode within the tube 32. By contrast, in a intermediate flow, for example, some of the fuel vapor still flows in laminar mode, but the other fuel vapor is transiting from the laminar flow mode towards the turbulent flow mode.

Figure 4:
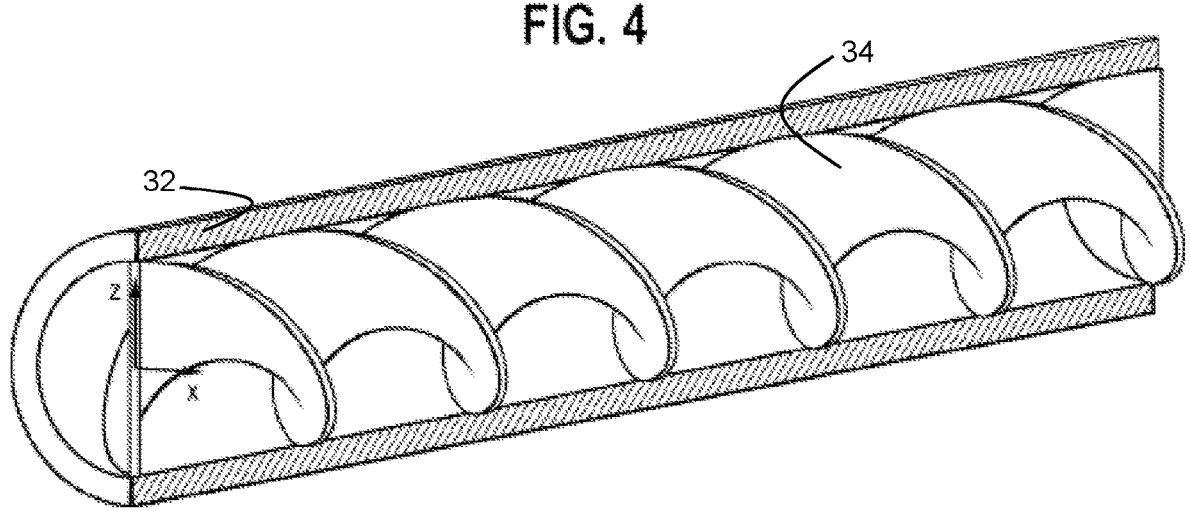
FIG. 4 is a schematic diagram showing the disposition of a membrane within the fuel separation apparatus in accordance with an embodiment.

The turbulence of the fuel vapor within the tube 32 can be accomplished, for example, by disposing the membrane 34 within the tube 32 as a twisted strip, for example, resembling a DNA strand as illustrated in FIG. 4. The membrane 34 may be twisted by 360 degrees. Where the tube 32 is long enough, the membrane 34 can be twisted within the tube 32 by multiples of 360 degrees. In another embodiment, a plurality of membranes may intersect within the tube 32 and be twisted with each other in a cross-shaped profile. Besides increasing the flow turbulence of the fuel vapor within the tube 32, the twisting of the membrane 34 also realizes a homogeneous flow of the fuel vapor across the membrane surface and reduces the axial length of separation apparatus 30.

In some implementations, the integration of the tube 32 and the membrane 34 or membranes can be implemented by utilizing a co-extrusion production process such that the tube 32 is a frame to support the membrane 34 or membranes.

The membrane 34 may separate the fuel vapor into a fuel-rich mixture and a fuel-lean mixture. The fuel-rich mixture contains a higher concentration of fuel components and a lower concentration of air components than the fuel-lean mixture. By contrast, the fuel-lean mixture contains a higher concentration of air components and a lower concentration of fuel components.

The driving force of the separation process is the gradient of partial pressure on both sides of the membrane 34. For example, with respect to the fuel components in the fuel vapor, there is a high concentration of fuel components on the side of the introduction port 322 but rare fuel components on the side of the discharge port 326 at the beginning, thus the partial pressure of fuel components is higher on the side of the introduction port 322 than on the side of the discharge 326. This partial pressure gradient drives the fuel components to permeate the membrane 34 with the help of the flow turbulence within the tube 32. When some fuel components permeate through the membrane 34 and are discharged at the discharge port 326, they may be conducted to other parts of the fuel emission control system. In this way, the discharge port 326 side keeps a low concentration fuel components, and thus the partial pressure gradient for the fuel component between the introduction port 322 and the discharge port 326 still presents, which continues driving fuel components to permeate the membrane 34. When the fuel components concentration on the side of introduction port 322 and the side of discharge port 326 is close or equal, this driving force lapses and the remained fuel components on the side of the introduction port 322 cannot permeate the membrane. Through this process, a majority of the fuel components permeate through the membrane 34 and a few of them are left behind.

With respect to the air components in the fuel vapor, as there are air components on both the side of introduction port 322 and the side of discharge port 326 at the beginning, the partial pressure gradient for the air components is small between the introduction port 322 and the discharge port 326. This small partial pressure gradient can merely drive a few of air components to permeate through the membrane 34 with the help of the flow turbulence within the tube 32 and be discharged at the discharged port 326. As a result, contrary to the fuel components, only a few of air components pass through the tube 32 and a majority of the air components are left behind.

Finally, the majority of the fuel components and the few of the air components permeating through the membrane 34 constitute the fuel-rich mixture. The few of the fuel components and the majority of the air components left behind constitute the fuel-lean mixture. The fuel-rich mixture is discharged at the discharge port 326 of the tube 32.

Additionally, to facilitate the separation, the membrane 34 may be made in a way that it is easier for the fuel components to permeate through the membrane 34 than the air components. For example, the silicon layer on the membrane ensures that hydrocarbon molecules permeate better through the membrane than the nitrogen and oxygen molecules.

Figure 5:
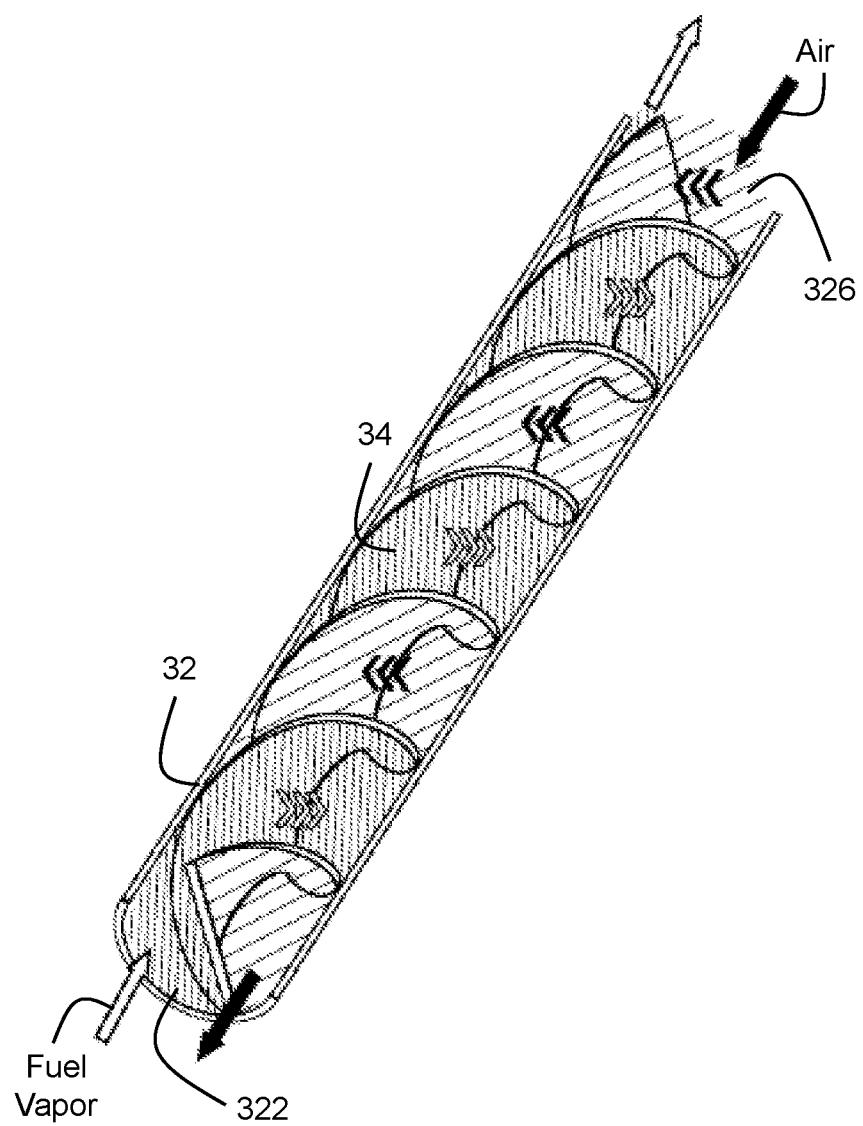
FIG. 5 is a schematic diagram showing the flow of the fuel and the air within the fuel separation apparatus in accordance with an embodiment.

In another embodiment, in order to maximize the partial pressure gradient along the membrane 34, the flow of the air may be made in an opposite direction to that of the fuel. As discussed above, a partial pressure of fuel is higher on the side of the introduction port 322 than on the side of the discharge port 326, thus the fuel flows towards the discharge port 326. To achieve the counter flow, a partial pressure of the air needs to be lower on the side of the introduction port 322 than on the side of the discharge port 326, which for example can be carried out by increasing the concentration of air on the side of the discharge port 326. As such, the air flows in an opposite direction to the fuel towards the introduction port 322. In an example, the twisted membrane 34 partitions the tube 32 into two flow channels. The fuel flows through one flow channel and the air flows through the other flow channel along the opposite direction as illustrated in FIG. 5. In some implementations, the fuel flow may contain some air components and the air flow may contain some fuel components.

Instead of developing an independent spatial units for the fuel emission control system to serve the separation function, the exemplary implementation of separation apparatus 30 fits itself into the conduit of the fuel emission control system and accomplish the similar separation function. As such, the physical dimension of the fuel emission control system can be reduced and the inner space of automobile vehicles can be saved for any other purposes.

Some embodiments of the fuel emission control system for the vehicle will be described as below with reference to FIGS. 6 and 7. Besides the separation apparatus, a fuel emission control system may include a canister loaded with, for example, activated charcoal, which may adsorb the fuel vapor flowing through the fuel emission control system.

In some embodiment of the fuel emission system, the separation apparatus may be arranged upstream of the canister. FIG. 6 shows an exemplary implementation of fuel emission control system 600 according to this embodiment. The fuel emission control system 600 may include a separation apparatus 30, a canister 20, and a conduit 46. The conduit 46 connects the fuel tank 10 of the vehicle to the canister 20. The fuel vapor generated in the fuel tank 10 flows to the canister 20 along the conduit 46. The separation apparatus 30 is disposed in the conduit and separates the inside of the conduit 46 into two half channels. In some implementations, the outer surface of the separation apparatus 30 may abut against the inner surface of the conduit 46. The separation apparatus 30 may include an introduction port 32, a discharge port 36, and a twisted membrane 34 that may be twisted about a central axis of the conduit. The implementation scheme of the membrane 34 is similar to the membrane 34 in the exemplary separated apparatus 30 of FIG. 1, and thus will not be described for brevity and clarity.

With this arrangement, the fuel vapor generated in the fuel tank 10 may first flow to the separation apparatus 30, where the fuel vapor is separated into the fuel-rich mixture and the fuel-lean mixture through the separation process as described above with reference to FIG. 1. Similarly, the fuel-rich mixture permeating through the membrane 34 is discharged at the discharge port 36 of the separation apparatus 30. Next, the fuel-rich mixture discharged by the separation flows to the canister 20 along the conduit 46. In the canister 20, the activated charcoal may adsorb the fuel within the fuel-rich mixture.

With respect to the fuel-lean mixture, it may be discharged through a valve 50 disposed in the conduit 46. For example, as shown in FIG. 6, the valve 50 is disposed close to the introduction port 32 of the separation apparatus 30.

The valve 50 may be controlled by an electronic control unit (ECU) 70 of the fuel emission control system. For example, the ECU 70 detects the internal pressure of the conduit 46 and controls to open or close the valve 50 when the internal pressure reaches a predetermined value.

In another embodiment of the fuel emission control system, the separation apparatus may be arranged before the canister. FIG. 7 shows an exemplary implementation of fuel emission control system 700 according to this embodiment. The fuel emission control system 700 may include a separation apparatus 30, a canister 20, as well as conduits 46 and 48. The conduit 46 connects the fuel tank 10 of the vehicle to the canister 20. The fuel vapor generated in the fuel tank may flow to the canister 20 along the conduit 46. The conduit 48 connects to the outlet of the canister 20 and conducts the fluid discharged from the canister 20 to flow through the fuel emission control system 700. The separation apparatus 30 may be disposed within the conduit 48. The separation apparatus 30 may include an introduction port 32, a discharge port 36, and a membrane 34. The implementation scheme of the membrane 34 is similar to the membrane 34 in the exemplary separated apparatus 30 of FIG. 1 and thus will not be described for brevity.

When the vehicle is resting and the fuel emission control system 700 is in operation, the fuel vapor generated in the fuel tank 10 may first flow to the canister 20 along the conduit 46. The canister 20 may adsorb a part of fuel components within the fuel vapor and discharge the remained fuel vapor including the fuel not adsorbed by the canister 20 and the air. Subsequently, the canister-discharged fuel vapor may flow along the conduit 48 to the separation apparatus 30, which may separate the canister-discharged fuel vapor into a fuel-rich mixture and a fuel-lean mixture through the separation process as described above with reference to FIG. 1. The fuel-rich mixture permeating through the membrane 34 is discharged at the discharge port 36 of the separation apparatus 30. Next, the fuel-rich mixture discharged by the separation apparatus may be conducted to the engine of the vehicle by the conduit 48. It may also be conducted back to and dissolve in the fuel tank 10.

Figure 6:
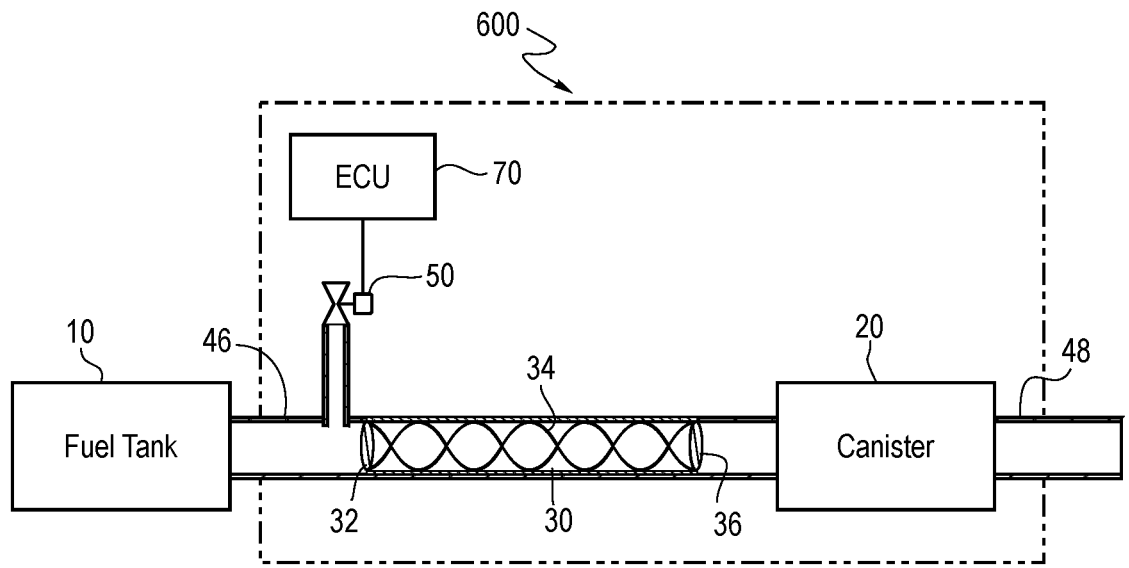
FIG. 6 shows a schematic diagram of a fuel emission control system in accordance with an embodiment.
Figure 7:
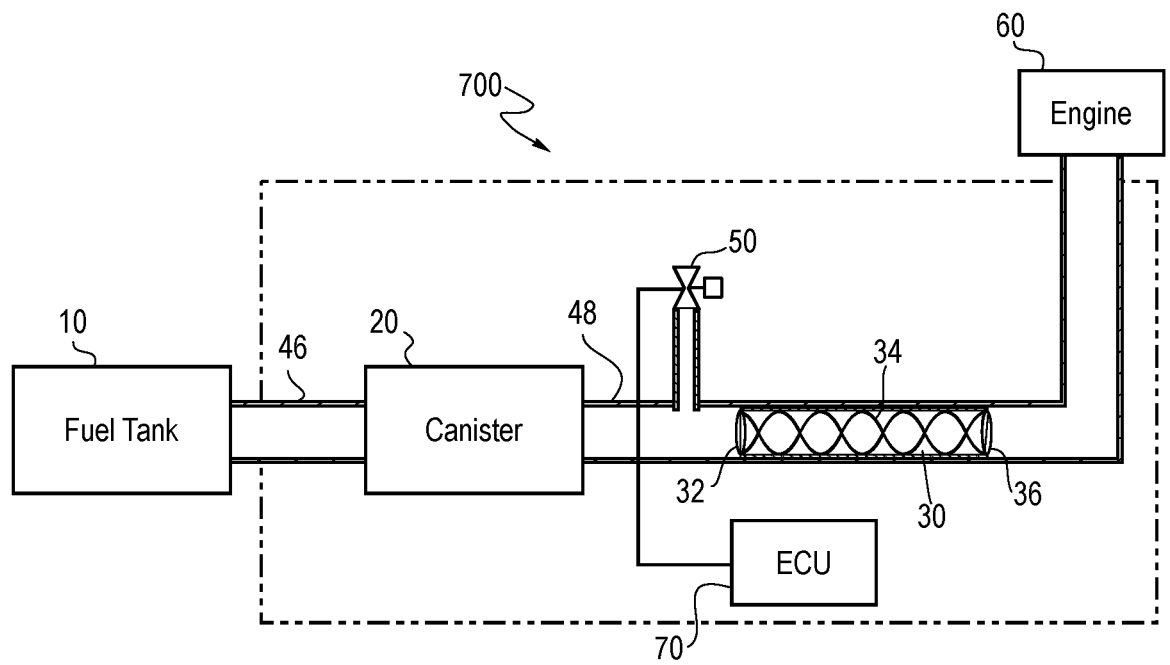
FIG. 7 shows a schematic diagram of a fuel emission control system in accordance with another embodiment.

Similar to the fuel emission control system 600 in FIG. 6, the fuel emission control system 700 may include a valve 50 disposed close to the introduction port 32 of the separation 30 and controlled by an ECU 70 as shown in FIG. 7. The fuel-lean mixture may be discharged through the valve 50.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. Similarly, terms, such as "a," "an," or "the," may be understood to convey a singular usage or to convey a plural usage, depending at least in part upon context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A separation apparatus for use in a fuel emission control system, comprising:
    a tube being disposed within a conduit of the fuel emission control system, the tube including an introduction port for introducing a fuel vapor generated in a fuel tank; and
    a membrane being disposed within the tube such that a disposition of the membrane increases turbulence of the fuel vapor in the tube and separates the fuel vapor into a fuel-rich mixture and a fuel-lean mixture;
    wherein the tube further includes a discharge port for discharging the fuel-rich mixture.

2. The separation apparatus of claim 1, wherein the membrane is disposed within the tube in a twisted shape.

3. The separation apparatus of claim 2, wherein the membrane is twisted by at least 360°.

4. The separation apparatus of claim 1, wherein the fuel vapor comprises fuel components and air components, the fuel-rich mixture contains a higher concentration of fuel components and a lower concentration of air components than the fuel-lean mixture.

5. The separation apparatus of claim 4, wherein the membrane has a porosity that is more permeable for fuel components than for air components.

6. The separation apparatus of claim 4, wherein the membrane partitions the tube into two flow channels, a partial pressure of fuel is higher on side of the introduction port than on side of the discharge port and a partial pressure of air is lower on the side of the introduction port than on the side of the discharge port, which renders the fuel components of the fuel vapor flows towards the discharge port through one flow channel and the air flows towards the introduction port through the other flow channel.

7. The separation apparatus of claim 1, wherein a diameter of the conduit is constant upstream from, along, and downstream from the tube.

8. The separation apparatus of claim 1, wherein the separation apparatus comprises a plurality of membranes, the plurality of membranes are disposed within the tube in twisted shape and twisted across with each other.

9. A fuel emission control system comprising:
    a canister adsorbing a fuel vapor generated in a fuel tank;
    a conduit providing fluid communication from the fuel tank to the canister; and
    a separation apparatus being disposed within the conduit and including:
        an introduction port for introducing the fuel vapor from the fuel tank,
        a membrane being disposed within the separation apparatus such that a disposition of the membrane increases turbulence of the fuel vapor in the separation apparatus and separates the fuel vapor into a fuel-rich mixture and a fuel-lean mixture, and
        a discharge port for discharging the fuel-rich mixture, wherein the discharged fuel-rich mixture flows to the canister for adsorption via the conduit.

10. The fuel emission control system of claim 9, wherein an outer surface of the separation apparatus abuts against an inner surface of the conduit.

11. A fuel emission control system comprising:
    a canister adsorbing a fuel vapor generated in a fuel tank and discharging a canister-discharged fuel vapor that is not adsorbed by the canister; and
    a separation apparatus including:
        an introduction port for introducing the canister-discharged fuel vapor,
        a membrane being disposed within the separation apparatus such that a disposition of the membrane increases turbulence of the canister-discharged fuel vapor in the separation apparatus and separates the canister-discharged fuel vapor into a fuel-rich mixture and a fuel-lean mixture, and
        a discharge port for discharging the fuel-rich mixture.

* * * * *